(12) United States Patent
Villechange et al.

(10) Patent No.: US 9,714,390 B2
(45) Date of Patent: Jul. 25, 2017

(54) PROCESS FOR PURIFYING A HYDROCARBON FEED

(71) Applicant: AXENS, Rueil Malmaison (FR)

(72) Inventors: Isabelle Villechange, Houilles (FR); Tom Frising, Nanterre (FR)

(73) Assignee: AXENS, Rueil Malmaison (FR)

( * ) Notice: Subject to any disclaimer, the term of this patent is extended or adjusted under 35 U.S.C. 154(b) by 292 days.

(21) Appl. No.: 14/387,874

(22) PCT Filed: Mar. 11, 2013

(86) PCT No.: PCT/FR2013/050502
§ 371 (c)(1),
(2) Date: Sep. 25, 2014

(87) PCT Pub. No.: WO2013/144476
PCT Pub. Date: Oct. 3, 2013

(65) Prior Publication Data
US 2015/0065765 A1    Mar. 5, 2015

(30) Foreign Application Priority Data
Mar. 26, 2012 (FR) ..................... 12 00887

(51) Int. Cl.
*C10G 53/08* (2006.01)
*C10L 3/12* (2006.01)
(Continued)

(52) U.S. Cl.
CPC ......... *C10G 53/08* (2013.01); *B01D 15/1885* (2013.01); *B01D 15/203* (2013.01);
(Continued)

(58) Field of Classification Search
CPC .. B01D 15/1885; B01D 15/203; C10G 25/00; C10G 53/08; C10G 53/16; C10G 67/06; C10L 3/12
(Continued)

(56) References Cited

U.S. PATENT DOCUMENTS

| 2,797,190 A | 6/1957 | Scott, Jr. et al. |
| 7,288,183 B2 | 10/2007 | Nicolaos et al. |

(Continued)

FOREIGN PATENT DOCUMENTS

| FR | 2857973 A1 | 1/2005 |
| FR | 2857974 A1 | 1/2005 |
| FR | 2889539 A1 | 2/2007 |

OTHER PUBLICATIONS

Axens (http://www.axens.net/product/catalysts-a-adsorbents/26/Id-265.html).*
(Continued)

Primary Examiner — In Suk Bullock
Assistant Examiner — Jason Chong
(74) Attorney, Agent, or Firm — Millen White Zelano and Branigan, PC; John Sopp; Anthony Zelano (57) ABSTRACT

A process for purifying a hydrocarbon feed, using a first adsorption unit with first and second adsorption columns respectively filled with first and second adsorbent solids by simultaneously:
a) treating the liquid phase hydrocarbon feed in the first adsorption column by contact with the first adsorbent solid to adsorb at least a portion of impurities present and to produce hydrocarbon effluent which is depleted in impurities;
b) treating a secondary liquid hydrocarbon feed constituted either by a fraction of the hydrocarbon feed or by a fraction of the hydrocarbon effluent and depleted in impurities to purify the secondary liquid hydrocarbon feed;
(Continued)

c) heating the treated secondary liquid hydrocarbon feed from step b);

d) regenerating the second adsorbent solid of the second adsorption column which comprises impurities with the secondary hydrocarbon feed heated in step c) to desorb the impurities to produce an effluent with impurities.

8 Claims, 5 Drawing Sheets

(51) Int. Cl.
    *C10G 67/06*      (2006.01)
    *C10G 53/16*      (2006.01)
    *B01D 15/20*      (2006.01)
    *B01D 15/18*      (2006.01)
    *C10G 25/00*      (2006.01)

(52) U.S. Cl.
    CPC .............. *C10G 25/00* (2013.01); *C10G 53/16* (2013.01); *C10G 67/06* (2013.01); *C10L 3/12* (2013.01)

(58) Field of Classification Search
    USPC .................. 585/820, 821, 822, 823, 830
    See application file for complete search history.

(56) References Cited

U.S. PATENT DOCUMENTS

| | | | |
|---|---|---|---|
| 7,731,836 | B2 | 6/2010 | Nicolaos et al. |
| 7,744,748 | B2 | 6/2010 | Nicolaos et al. |
| 2005/0061712 | A1 | 3/2005 | Nicolaos et al. |
| 2005/0075528 | A1* | 4/2005 | Burkhardt ............... B01J 20/08 |
| | | | 585/820 |
| 2005/0092655 | A1 | 5/2005 | Nicolaos et al. |
| 2007/0261993 | A1 | 11/2007 | Nicolaos et al. |

OTHER PUBLICATIONS

International Search Report dated Jul. 2, 2013 issued in corresponding PCT/FR2013/050502 application (pp. 1-2).

* cited by examiner

PROCESS FOR PURIFYING A HYDROCARBON FEED

The present invention relates to a process for purifying a liquid hydrocarbon feed, for example a feed deriving from crude oil distillation units, by means of an adsorption unit comprising at least one regenerable adsorbent. The process of the invention is of particular application in the treatment of light oil cuts.

PRIOR ART

The crude oil which is extracted from geological formations is a complex mixture of various hydrocarbon compounds and is of no commercial interest per se. In order to be exploitable, the crude oil has to undergo several processing steps in order to separate various fractions which are of industrial and commercial interest in fields as diversified as energy, transport and chemistry.

These treatments are carried out in refining units of varying complexity which comprise at least one crude oil distillation facility. This distillation step is generally carried out in a column and consists of a separation of the hydrocarbon compounds as a function of their boiling point. Given that crude oil is constituted by a large number of compounds, the aim here is not to obtain pure compounds but rather "cuts" which encompass compounds having similar physico-chemical characteristics. After fractionation, these distillation cuts still contain unwanted impurities such as water, sulphur-containing compounds, nitrogen-containing or even oxygen-containing compounds which have to be eliminated during subsequent purification operations.

One method for carrying out the purification uses an adsorption process which consists of passing the feed to be treated through an adsorption column containing a solid adsorbent having a high affinity for the impurities to be eliminated. Once the adsorbent solid is saturated with impurities, it has to be regenerated by desorption using a fluid known as a "regenerant". One process used in the purification of a liquid feed is the TSA (Thermal Swing Adsorption) process in which the adsorption phase is brought to a temperature typically in the range −50° C. to 100° C. and the desorption phase is carried out at high temperature, typically between 100° C. and 350° C., using a pre-heated fluid.

Thus, carrying out the TSA process requires there to be a source of regeneration fluid at the treatment site, which gives rise to costs linked to supply and storage of that fluid.

SUMMARY OF THE INVENTION

Thus, one aim of the invention is to propose a process for the purification of hydrocarbons by adsorption, in which the provision of a regeneration fluid outside the treatment unit can be dispensed with and which is more economical because of improved thermal integration.

To this end, a process is proposed for purifying a hydrocarbon feed comprising impurities, in which the following steps are carried out simultaneously:

a) treating the hydrocarbon feed in the liquid phase in a first adsorption unit comprising a first and a second adsorption column respectively filled with a first and second adsorbent solid, the first and second adsorption columns operating in parallel and alternately in adsorption mode and in regeneration mode, said hydrocarbon feed being introduced into the first adsorption column and brought into contact with the first adsorbent solid, and a hydrocarbon effluent which is depleted in impurities is taken off at the outlet from the first adsorption column;

b) treating a secondary liquid hydrocarbon feed which is constituted either by a fraction of the hydrocarbon feed or by a fraction of the hydrocarbon effluent which is depleted in impurities in a treatment unit and a treated secondary liquid hydrocarbon feed is taken off from said treatment unit;

c) heating the treated secondary liquid hydrocarbon feed obtained from step b);

d) regenerating the second adsorbent solid of the second adsorption column with the secondary hydrocarbon feed heated in step c) by bringing said feed into contact with the second adsorbent solid in order to desorb the impurities from the second adsorbent solid and produce an effluent which is charged with impurities, step d) being carried out by sending said heated secondary hydrocarbon feed to the second adsorption column as a counter-current to the direction of introduction of the hydrocarbon feed into the first adsorption column.

The process of the invention thus uses an internal process stream as a regeneration fluid which is generated in situ, so that it is no longer necessary to provide a source of regeneration fluid which is external to the process.

In the context of the invention, the term "internal stream" is intended to mean a stream generated by one of the units forming an integral part of the process.

Because of the presence of certain impurities, the internal fluid cannot in general be exploited directly as a regenerant. In accordance with the present invention, the internal fluid is treated to render it chemically "inert" as regards the adsorbent solid. In the context of the invention, the treatment is intended to restrain deactivation of the adsorbent solid when said internal fluid is brought into contact with it during the regeneration phase. An example of impurities which may be cited are olefins, which have a tendency to form coke precursors on the surface of the solid when they are subjected to high temperatures.

Thanks to the process of the invention, thermal integration is improved because the step for treatment of the regeneration fluid is incorporated into the adsorption treatment process. The heat energy developed upstream or downstream of the treatment step is advantageously recovered to then bring the regeneration fluid to its operational regeneration temperature. In fact, in the case in which the treatment of the regeneration fluid is carried out in a treatment unit which is totally independent of the purification unit, it is necessary to cool the treated fluid for storage thereof before it is used. This cooling is not advantageous in terms of thermal integration, because the treated fluid then has to be heated up again to high temperatures so that it can be used as a regeneration fluid.

In accordance with the invention, the treated regeneration fluid is introduced into the adsorption column to be regenerated as a counter-current to the direction of introduction of the feed to be treated into the column when the latter is operating in adsorption mode. This operative mode is advantageous as it requires less heat to be supplied in order to obtain the same regenerative quality, which thus results in a saving on operational costs.

Another advantage linked to the invention is that a process is provided which operates in an autonomous manner. Another advantage of the process of the invention resides in the fact that the treatment unit can easily be adapted to the feed to be treated, and in particular to the impurities it contains.

Advantageously, the dimensions of the treatment unit are such that only that quantity of internal fluid (i.e. the hydrocarbon feed or the treated hydrocarbon effluent) is treated which is necessary for regeneration of the adsorption columns of the first adsorption unit.

Preferably, the process is carried out in a manner such that the operational mode of the first and second adsorption columns is switched so that the second adsorption column operates in adsorption mode and the first column operates in regeneration mode. The switching may be carried out periodically or as a function of the degree of saturation of the adsorbent solid.

In accordance with one embodiment, the treatment unit of step b) is a second adsorption unit comprising a third and fourth adsorption column respectively comprising a third and fourth adsorbent solid. The secondary liquid hydrocarbon feed is brought into contact with the third adsorbent solid in the third adsorption column so as to produce the treated secondary liquid hydrocarbon feed, and the effluent charged with impurities obtained from the second adsorption column which is in regeneration mode is sent to the fourth adsorption column so as to regenerate the fourth adsorbent solid and evacuate an effluent charged with impurities.

In a preferred embodiment, the mode of operation of the third and fourth adsorption columns is switched so that the fourth adsorption column operates in adsorption mode and the third column operates in regeneration mode. The switching may be carried out periodically or as a function of the degree of saturation of the adsorbent solid.

In a variation, the adsorption or regeneration operational mode of the fourth adsorption columns is switched simultaneously: the mode of operation, adsorption or regeneration, of the first and third columns is switched simultaneously, and at the same time the mode of operation, adsorption or regeneration, of the second and fourth adsorption columns is simultaneously switched.

In this preferred variational embodiment of the invention, the dimensions of the third and fourth adsorption columns may be such that they are saturated with impurities simultaneously or after the first and second adsorption columns. In the context of this variation, the mode of operation of the four adsorption columns may be switched simultaneously when the first or the second adsorption column operating in adsorption mode is saturated with impurities. In accordance with this preferred variation, the first and third adsorption columns on the one hand or the second and fourth adsorption columns on the other hand operate simultaneously either in adsorption mode or in regeneration mode. Thus, for example, when the first and third adsorption columns operate simultaneously in adsorption mode, the second adsorbent solid of the second adsorption column is regenerated with the secondary feed heated in step c) in order to desorb the impurities from the second adsorbent solid and the fourth adsorbent solid of the fourth adsorption column is regenerated with the effluent obtained from the second adsorption column. In reciprocal manner, when the second and fourth adsorption columns operate simultaneously in adsorption mode, the first adsorbent solid of the first adsorption column is regenerated with the secondary feed heated in step c) in order to desorb the impurities from the first adsorbent solid and the third adsorbent solid of the third adsorption column is regenerated with the effluent obtained from the first adsorption column.

In accordance with another embodiment, at least a portion of the organo-sulphur compounds present in the secondary liquid hydrocarbon feed is eliminated by adsorption in the treatment unit of step b).

In accordance with another embodiment, at least a portion of the olefinic compounds present in the secondary liquid hydrocarbon feed is selectively hydrogenated in the treatment unit of step b).

The process of the present invention is applicable to the treatment of a hydrocarbon feed which is in liquid phase at the operating temperature and pressure of the adsorption/regeneration unit.

The process of the invention is applicable to a hydrocarbon feed selected from a cut comprising hydrocarbons containing 2 to 8 carbon atoms and a cut comprising hydrocarbons having boiling points in the range 0° C. to 200° C. As an example, it may be a cut comprising propane, butane, pentane, hexane, etc., alone or as a mixture, or a light or heavy naphtha cut. The hydrocarbon feed to be purified preferably contains less than 50% by weight of olefins with respect to the total weight of the cut, preferably less than 20% by weight and more preferably less than 10% by weight.

In accordance with the invention, the adsorbent solids used in the process are selected from metallic oxides (by themselves or mixed with one or more binders or deposited on a support), metallic sulphides (by themselves or mixed with one or more binders or deposited on a support), reduced metals (by themselves or mixed with one or more binders or deposited on a support) which may optionally be doped and/or sulphurized, MOFs (Metal Organic Frameworks) and/or their mixtures. Preferably, they comprise at least one element selected from activated or promoted aluminas, clays, molecular sieves such as zeolites, silica gels, silica-aluminas and activated carbon.

For the adsorption phase, the temperature is in the range from approximately −50° C. to 100° C., preferably in the range 0° C. to 50° C., and the pressure is in the range $10^{-3}$ to 10 MPa, preferably in the range 0.1 to 5 MPa. Regarding the regeneration phase, it is preferably carried out at a temperature in the range 100° C. to 350° C., preferably in the range 200° C. to 310° C., and at a pressure of approximately $10^{-3}$ to 10 MPa, more preferably in the range 0.1 to 5 MPa.

In accordance with the present invention, the adsorption may be carried out by using any type of adsorption technology which is known to the skilled person; preferably, the technology is used with a fixed bed adsorbent solid.

In accordance with the present invention, the impurities to be eliminated from the hydrocarbon feed may be selected from water, nitrogen-containing compounds, sulphur-containing compounds, oxygen-containing compounds, aromatic compounds, chlorinated compounds, mercury, arsines and phosphines, alone or as a mixture.

Further characteristics and advantages of the invention will become apparent from the following description made with reference to the drawings, in which:

BRIEF DESCRPITION OF THE FIGURES

The figures are not drawn to scale. In general, similar elements are given similar references in the figures.

Figure 1:
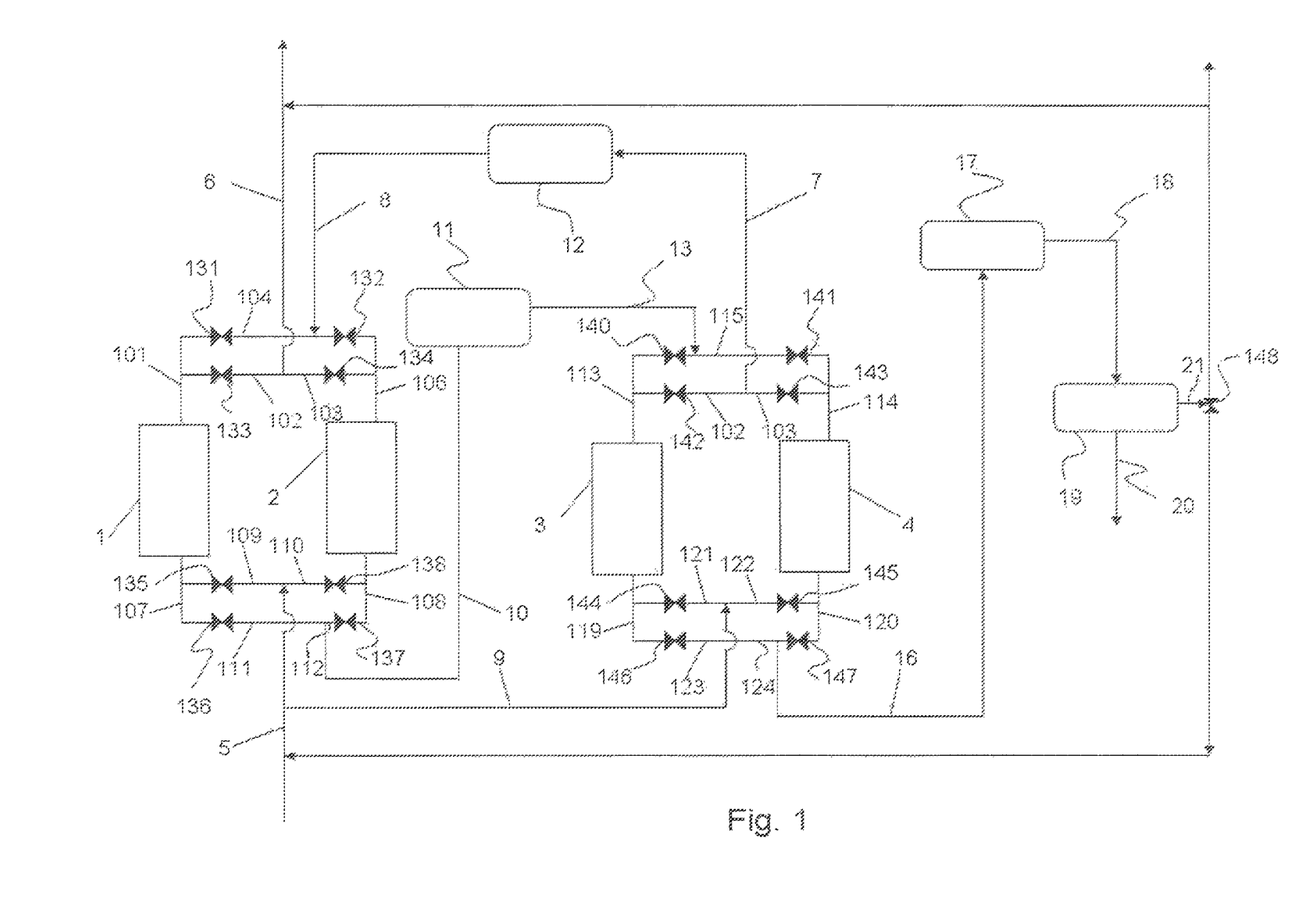
FIG. 1 shows a block diagram of a first example of a purification unit of the invention.

FIG. 1 represents a first exemplary embodiment of a purification unit of the invention which can be used to carry out the process of the invention. This unit comprises:

a first adsorption column 1 filled with a first adsorbent solid;

a second adsorption column 2 containing a second adsorbent solid identical to the first adsorbent and arranged so as to operate in alternation with the first adsorption column 1, so that when the first column 1 is in the adsorption phase, the second column 2 is in the regeneration phase and when the first adsorption column 1 is saturated, the respective roles of the two columns 1, 2 are switched;

a treatment unit, broadly speaking, which in the present example is constituted by a second adsorption/regeneration unit comprising a third and fourth adsorption column 3, 4 operating in parallel with each other in an alternating adsorption and regeneration mode;

heating means 12 for heating a fluid obtained from one of the third and fourth adsorption columns 3, 4.

In operation, the feed to be treated is supplied to the first adsorption column 1 via the lines 5, 111, 107. The column 1, which operates in adsorption, is operated at a temperature which is generally in the range −50° C. to 100° C., preferably in the range 0° C. to 50° C., and at a pressure in the range $10^{-3}$ to 10 MPa, preferably in the range 0.1 to 5 MPa. The adsorption columns 1, 2 are filled with an adsorbent solid or a mixture of adsorbent solids selected from metallic oxides (by themselves or mixed with one or more binders or deposited on a support), metallic sulphides (by themselves or mixed with one or more binders or deposited on a support), reduced metals (by themselves or mixed with one or more binders or deposited on a support) which may optionally be doped and/or sulphurized, and MOFs ("metal organic frameworks"). Preferably the adsorbent solid or mixture of adsorbent solids is selected from activated or promoted aluminas, clays, molecular sieves such as zeolites, silica gels, silica-aluminas, and activated carbon. The adsorbent solids used are clearly selected as a function of the impurities to be adsorbed. By way of (non-exhaustive) example, the impurities are water, nitrogen-containing compounds, sulphur-containing compounds, oxygen-containing compounds, aromatic compounds, chlorinated compounds, mercury, arsines and phosphines.

The purification process of the invention is applicable to any hydrocarbon feed which is in liquid phase under the temperature and pressure conditions at which the adsorption column is operated. Thus, the hydrocarbon feed may be selected from a cut comprising hydrocarbons containing 2 to 8 carbon atoms and a cut comprising hydrocarbons having boiling points in the range 0° C. to 200° C. As an example, it may be a cut comprising propane, butane, pentane, hexane, etc., alone or as a mixture, or a light or heavy naphtha cut. The hydrocarbon feed to be purified preferably contains less than 50% by weight of olefins with respect to the total weight of the cut, preferably less than 20% by weight and still more preferably less than 10% by weight.

The purified effluent is evacuated from the column 1 via the lines 101, 102, 6 to another unit, or simply sent to a storage zone.

In parallel and concomitantly, column 2 operates in the regeneration phase in order to restore the adsorption capacity of the adsorbent solids charged with impurities during a preceding operating cycle. In order to carry out this regeneration by modulating the temperature (TSA process), a "clean", hot fluid must be available. In order to solve the problem of having a readily accessible and economical regeneration fluid, the process of the invention uses a fluid which derives from an internal process stream. The solution in this embodiment consists of taking a portion of the feed to be treated and purifying it in the second adsorption unit in order to limit phenomena of deactivation of the adsorbent solid to be regenerated.

According to Example 1, the regeneration fluid is obtained from a treatment unit which forms an integral part of the purification unit. The treatment unit comprises two adsorption columns 3 and 4 forming a second adsorption unit which operate in parallel and alternately in adsorption mode and in regeneration mode.

A fraction of the feed to be treated is supplied to the adsorption column 3 via the lines 9, 121, 119 in order to purify it. The treated effluent which acts as a regeneration fluid for the first adsorption unit is evacuated by means of lines 113, 102 and 7 to the heating train 12. The heating train can be used to heat the treated effluent, which is in liquid phase, to a temperature which is suitable for desorbing the impurities retained on the adsorbent solid of the column 2 (TSA process). In the context of the invention, the heating may also be carried out so as to vaporize the effluent and thus form a purge gas.

The hot, treated effluent (regeneration fluid) is transferred to the adsorption column 2 via the line 8, 104, 106 and brought into contact with the adsorbent solid charged (or even saturated) with impurities in order to desorb said impurities. The regeneration phase is preferably carried out at a temperature in the range 100° C. to 350° C., preferably in the range 200° C. to 310° C., and at a pressure of approximately $10^{-3}$ to 10 MPa, preferably in the range 0.1 to 5 MPa. As can be seen in FIG. 1, the regeneration fluid is introduced into the adsorption column 2, which is operating in regeneration mode, as a counter-current with respect to the direction of introduction of the feed to be treated into the adsorption column 1. More precisely, referring to FIG. 1, the feed to be treated is introduced into the bottom of the adsorption column 1 via the line 5, while the regeneration fluid is sent to the head of the adsorption column 2 via lines 8, 104 and 106.

The hot regeneration fluid after moving in the second adsorption column 2 and charged with impurities released from the adsorbent solid is evacuated via the lines 108, 112 and 10 from the second adsorption column 2. As can be seen in FIG. 1, the hot regeneration fluid charged with impurities is advantageously used as a fluid to regenerate the adsorbent solid of the fourth adsorption column 4. Before it is passed into the fourth column 4, the regeneration fluid is again heated in a heating device 11 which, for example, is an electric furnace, to bring the fluid to its operational regeneration temperature. The regeneration fluid is then introduced into the column 4 via the lines 13, 115 and 114 where it is brought into contact with the adsorbent solid to be regenerated. Preferably, as in the case of the principal adsorption unit, the regeneration fluid treatment unit is configured such that introduction of said fluid into the adsorption column 3 in the "adsorption" operational mode is carried out as a counter-current to the direction of introduction of the regeneration fluid obtained from the column 2 into the column 4 in the regeneration phase.

The residual fluid charged with impurities leaving the fourth adsorption column 4 is evacuated via the line 120, 124 and 16 to a condenser 17 where it is cooled. The liquid extracted from the condenser 17 via the line 18 may be sent either upstream or downstream of the first adsorption unit, depending on its impurities content.

Advantageously, as can be seen in FIG. 1, the liquid obtained from the condenser 17 is transferred to a separator drum 19 where condensed free water is separated from the hydrocarbon phase. In this case, the condensation water is channelled via the line 20 to a water treatment unit, while the hydrocarbon phase is taken off via the line 21 and sent either upstream or downstream of the first adsorption/regeneration unit, depending on its impurities content. As mentioned above, the phase for regeneration of column 4 is preferably carried out at a temperature in the range 100° C. to 350° C., preferably in the range 200° C. to 310° C., at a pressure of approximately $10^{-3}$ to 10 MPa, preferably in the range 0.1 to 5 MPa.

When the cycle time for operation of the adsorption column 1 is reached, for example fixed by a threshold value for the adsorption capacity, supply of the hydrocarbon feed to be treated in column 1 is stopped and the operational mode of columns 1 and 2 is switched. Thus, in the subsequent cycle, the column 1 operates in regeneration while the column 2 works in adsorption.

This operational mode is applied to the second adsorption unit where the columns 3 and 4 function alternately in regeneration mode and adsorption mode. Further and preferably, the counter-current introduction described above for the principal adsorption unit (columns 1 and 2) is applicable for the operation of the unit for treatment of the regeneration fluid (columns 3 and 4).

In accordance with a preferred operational mode, the swing in the operation of columns 1 and 2 may trigger a swing in the operation of those of columns 3 and 4. In accordance with a preferred variation of the invention, the dimensions of columns 3 and 4 are such that they are saturated in impurities simultaneously with or after columns 1 and 2. In the context of this variation, the mode of operation of the four columns is switched simultaneously when the first or second column operating in adsorption is saturated with impurities. In accordance with this preferred variation, columns 1 and 3 on the one hand or 2 and 4 on the other hand operate simultaneously either in adsorption mode or in regeneration mode. Thus, for example, when columns 1 and 3 operate simultaneously in adsorption mode, the second adsorbent solid is regenerated with the secondary feed heated in step c) in order to desorb the impurities from the second adsorbent solid and the fourth adsorbent solid of the fourth adsorption column 4 is regenerated with the effluent obtained from the second adsorption column 2. In a reciprocal manner, when columns 2 and 4 operate simultaneously in adsorption, the first adsorbent solid is regenerated with the secondary feed heated in step c) in order to desorb the impurities from the first adsorbent solid, and the third adsorbent solid of the third adsorption column 3 is regenerated with the effluent obtained from the first adsorption column 1.

The second embodiment of the purification unit is similar to that of Example 1, but differs essentially in the fact that the second adsorption unit used to treat the feed in order to render it compatible as a regeneration fluid is replaced by a selective hydrogenation reactor.

Figure 2:
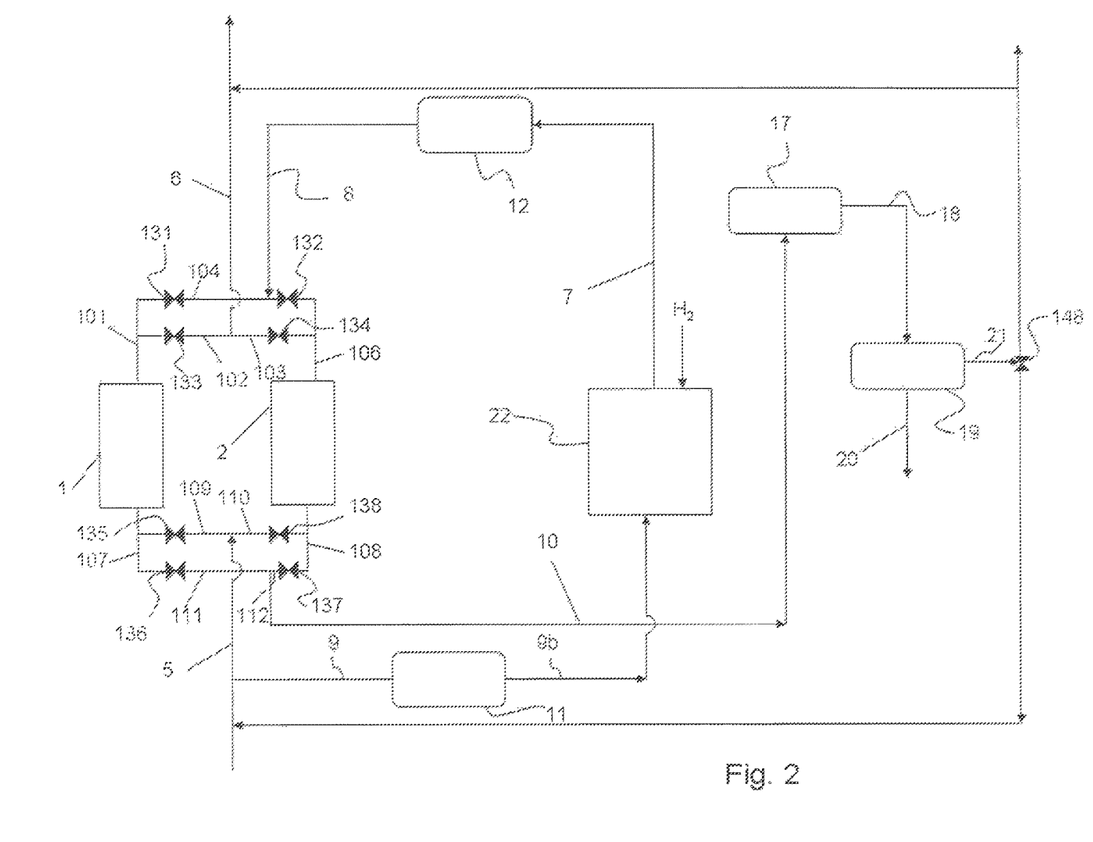
FIG. 2 shows a block diagram of a second example of a purification unit of the invention in which the treatment unit is a hydrogenation reactor.

The purification unit represented in FIG. 2 comprises:
an adsorption unit including two adsorption columns 1, 2 working alternately in adsorption and in regeneration;
a selective hydrogenation reactor 22;
heating means 12 to heat the fluid treated by the total hydrogenation reactor and to vaporize it.

The description relating to the operational mode of the first adsorption unit of FIG. 1 is applicable to the adsorption unit of FIG. 2.

In accordance with the second embodiment, the unit for the treatment of the feed which can be used to produce the regeneration fluid in situ is a selective hydrogenation unit. The principal function of this treatment unit is to transform the olefinic compounds, which are coke precursors, into paraffinic compounds.

Referring now to FIG. 2, the hydrocarbon feed is removed via the line 9 and sent to a selective hydrogenation reactor 22 where it is brought into contact with hydrogen in the presence of a selective hydrogenation catalyst. The liquid feed is pre-heated using a heating device 11 (for example a vapour exchanger) before being introduced into the selective hydrogenation unit 22. The treated effluent which is extracted via the line 7 of the hydrogenation reactor 22 is then heated by means of a heating train 12 which may be composed of a vapour exchanger and an electric furnace disposed in succession. The heating train 12 heats the treated effluent in order to produce a regeneration fluid. The regeneration fluid obtained thereby, internally to the process, is then transferred to the second adsorption column 2 via the lines 8, 106 in order to regenerate the second adsorbent solid.

As can be seen in FIG. 2, the regeneration fluid obtained from the treatment unit 22 is introduced into the adsorption column 2 as a counter-current to the direction in which the feed to be treated is sent to the adsorption column operating in adsorption mode.

The effluent charged with impurities is evacuated from the second column 2 via the lines 108, 112 and 10 to an exchanger 17, where it is cooled. The liquid extracted from the exchanger 17 via the line 18 may be recycled either upstream or downstream of the adsorption/regeneration unit, depending on its impurities content. Referring now to FIG. 2, the liquid is firstly sent to a separator drum 19 in order to separate the water from the liquid hydrocarbon phase. The water of condensation is transferred to a water treatment unit by means of the line 20, while the hydrocarbon phase is sent either upstream or downstream of the adsorption unit, depending on its impurities content.

The third embodiment is similar to that of Example 2, but differs in that the selective hydrogenation unit is replaced by a non-regenerable adsorption unit ("guard bed").

Figure 3:
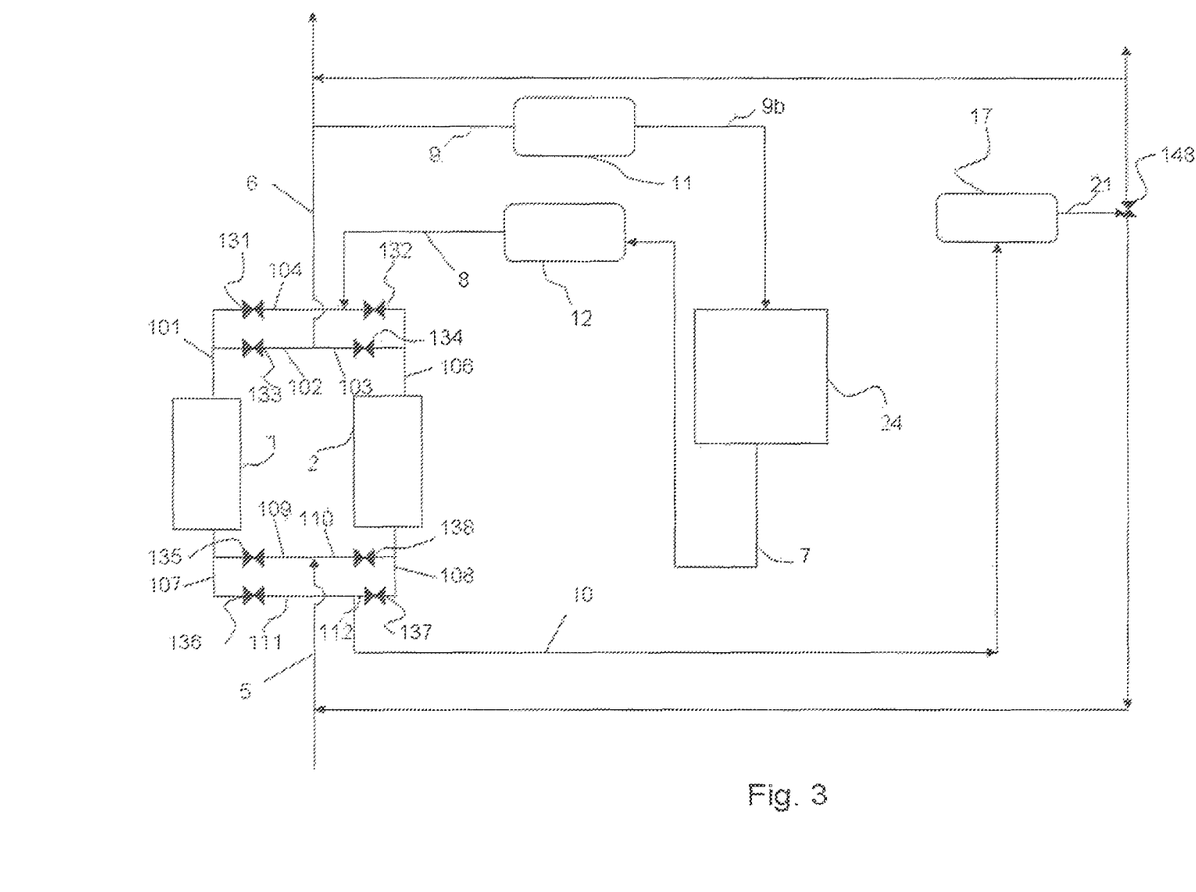
FIG. 3 shows a block diagram of a third example of a purification unit of the invention in which the treatment unit is a non-regenerable adsorption column.

The purification unit shown in FIG. 3 thus comprises:
an adsorption unit constituted by two adsorption columns 1, 2 operating alternately in adsorption mode and in regeneration mode;
a non-regenerable adsorption column 24;
heating means 12 to heat the treated fluid obtained from the non-regenerable adsorption column 24.

The mode of operation of the first adsorption unit of FIG. 1 is applicable to the adsorption unit of FIG. 3 and thus will not be described again.

In this third embodiment, the effluent treated by the adsorption unit 1, 2 is used as the regeneration fluid which is internal to the process. The treated fluid is first purified by passage through a non-regenerable adsorption column 24. The aim of this treatment is, for example, to reduce the quantity of organo-sulphur compounds in the treated effluent. Examples of organo-sulphur compounds concerned in this treatment are mercaptans and sulphides, which are coke precursors at high temperatures.

Referring now to FIG. 3, a fraction of the effluent treated by the adsorption unit 1, 2 is taken off via the line 9 then heated via a heating train 11 (for example a vapour exchanger) and sent to the non-regenerable adsorption column 24.

The purified effluent leaving the non-regenerable adsorption column 24 via the line 7 is then heated by passage through a heating train 12. The hot fluid, which may be liquid or gaseous, will supply the column of the adsorption unit 1, 2 to be regenerated via the lines 8, 104 and 106 or 8, 104 and 101.

In an identical manner to the embodiments of FIGS. 1 and 2, after treatment in the non-regenerable adsorption column 24 and heating in the heating train 11, the regeneration fluid is introduced via the lines 8, 104, 106 or 8, 104 and 101 as a counter-current with respect to the direction of introduction of the feed to be treated in columns 1 or 2 (in adsorption mode) of the principal adsorption unit.

As in the preceding examples, the regeneration fluid charged with impurities is evacuated to an exchanger 17 via the line 108 and 10. The liquid extracted from the exchanger 17 is recycled either upstream or downstream of the adsorption/regeneration unit, depending on its impurities content.

Figure 4:
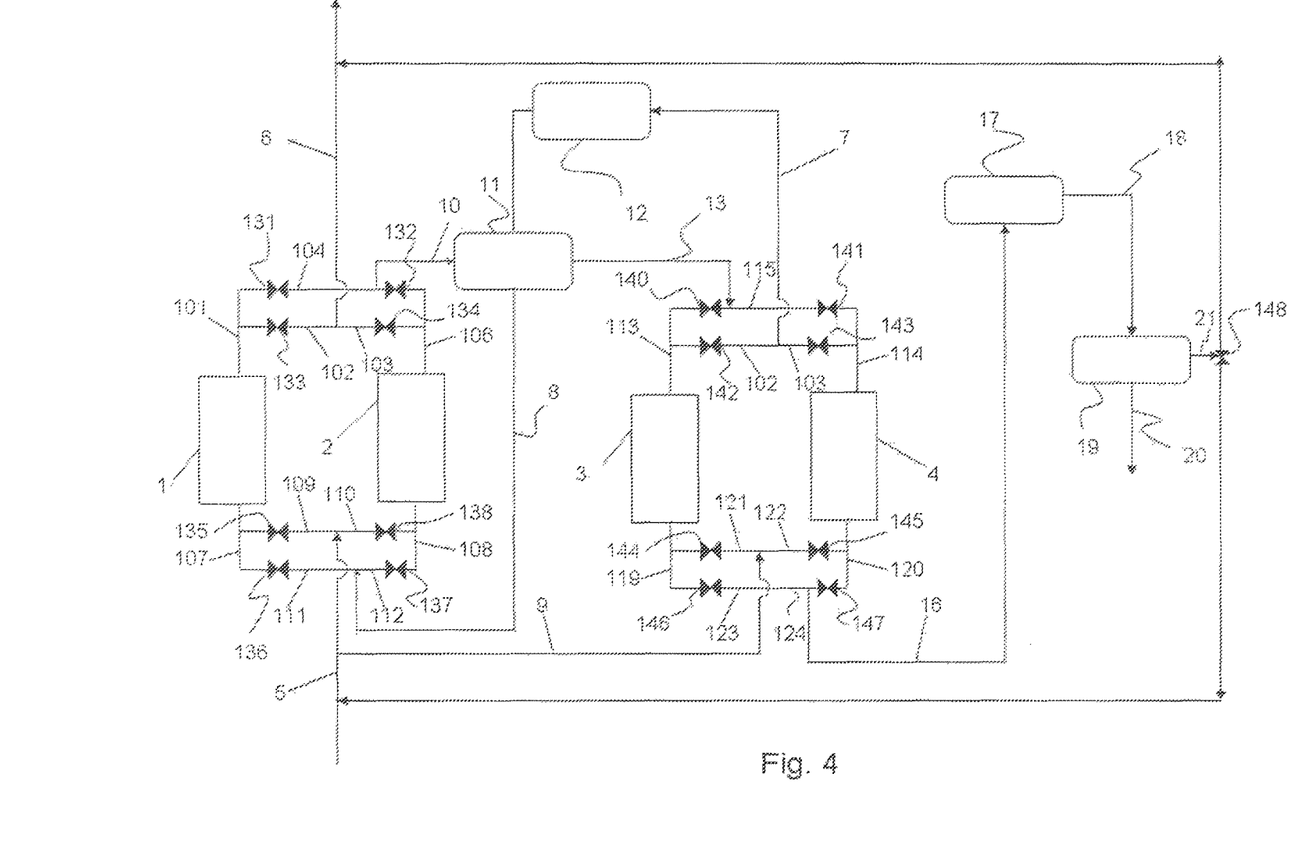
FIGS. 4 and 5 each show a block diagram respectively similar to FIGS. 1 and 2 but in which the feed to be treated in the column operating in the adsorption phase is introduced as a counter-current to the direction of introduction of the regeneration fluid into the adsorption column which is in the regeneration phase.
Figure 5:
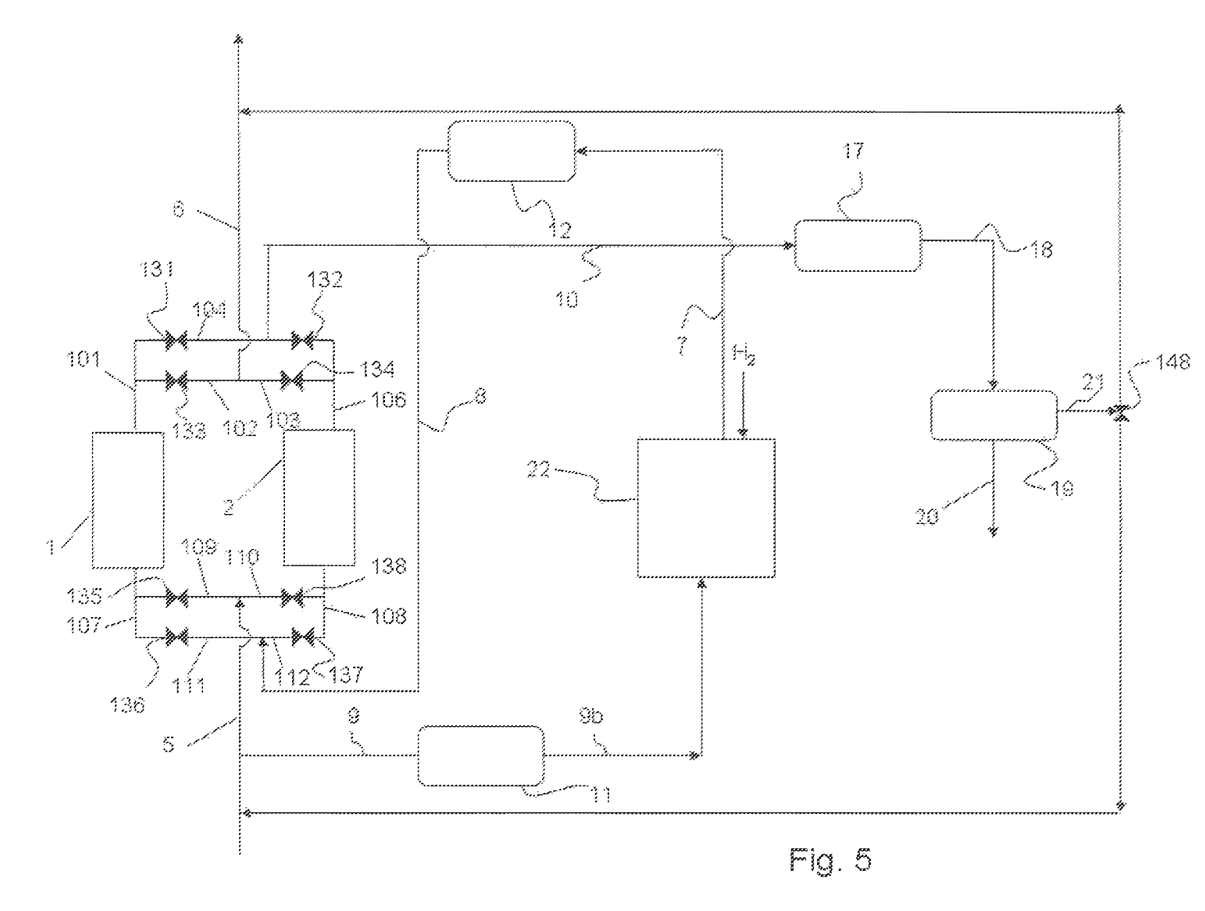

Referring now to FIGS. 4 and 5, the embodiments of these figures are respectively identical to FIGS. 1 and 2 (in accordance with the invention), with the exception of the fact that the regeneration fluid obtained from the treatment units is introduced as a co-current with respect to the direction of introduction of the feed to be treated in the columns 1 or 2 (in adsorption mode) of the principal adsorption unit.

EXAMPLE 1

Example 1 illustrates the operation of the process of FIG. 1.

In this example, a LPG feed at a flow rate of 9820 kg/h with the composition (expressed as a % by weight) indicated in Table 1 is to be purified.

TABLE 1

Composition of LPG feed

| | |
|---|---|
| Ethane | 2.1 |
| Propane | 57.4 |
| i-Butane | 10.0 |
| n-Butane | 30.0 |
| i-Pentane | 0.3 |
| n-Pentane | 0.2 |

The LPG feed also contained impurities, as summarized in Table 2:

TABLE 2

Impurities in LPG feed

| | |
|---|---|
| Water | 500 ppm by weight |
| Total sulphur | 20 ppm by weight as S |
| Ethylmercaptan | 2 ppm as S |
| Disulphides | 10 ppm as S |
| Other sulphur-containing compounds(CS2) | 8 ppm as S |

The aim of purification is to dry the LPG feed in order to eliminate water, to comply with the requirement for a water content of less than 10 ppm.

To this end, the water was eliminated by means of an adsorption unit comprising two adsorption columns 1 and 2 operating in parallel and alternately in adsorption mode and in regeneration mode. The adsorption columns 1 and 2 had the following characteristics:

diameter: 700 mm height of adsorbent bed: 5400 mm.

These columns were filled with a mixture of adsorbent solids comprising 30% by volume of AxSorb A (trade mark) and 70% by volume of AxSorb 543 (trade mark) sold by Axens.

When the columns operated in adsorption mode, they were operated at a temperature of approximately 40° C. and at a pressure of 1.4 MPa. After passage through the first adsorption unit, a purified LPG was obtained with a water content of 9 ppm (by weight) and a total sulphur of 20 ppm (by weight) as S.

The adsorption columns 3 and 4 of the adsorption unit for the treatment of the secondary hydrocarbon feed had the following characteristics:

diameter: 500 mm height of adsorbent bed: 6200 mm.

These columns were filled with a mixture of adsorbent solids comprising 12% by volume of AxSorb A (trade mark) and 88% by volume of AxSorb 913 (trade mark) sold by Axens. The mixture of adsorbents mentioned above could not only be used to adsorb water, but also sulphur-containing molecules present in the LPG feed. A fraction of the LPG feed at a temperature of 40° C. was taken off upstream of the first adsorption unit and sent to the adsorption column 3. The dimensions of column 3 were so as to treat 1300 kg/h of feed with the same composition as that shown in Tables 1 and 2. The temperature and pressure of operation of column 3 in adsorption mode were 40° C. and 1.7 MPa respectively. The treated effluent leaving column 3 and having water and total sulphur contents of less than 1 ppm by weight was heated in a heating train to 310° C., at which temperature the treated LPG was in the vapour form, before being sent through one of the columns of the first adsorption unit which was in its regeneration phase. The LPG was introduced as a counter-current with respect to the direction of introduction of the feed to be treated into the column when it operated in adsorption mode. The heating train 12 comprises a vapour exchanger and a principal electric furnace.

Regeneration was carried out at a temperature of approximately 310° C. and at a pressure of approximately 1.5 MPa.

After moving through the adsorption column 2 in regeneration mode, the hot regeneration fluid was used as the fluid to regenerate the adsorbent solid of column 4 of the second adsorption unit. Before passing it through said column in regeneration mode, the regeneration fluid was heated up again in a heating device 12 which was a secondary electric furnace, in order to bring the temperature of the fluid to approximately 310° C.

The residual fluid charged with water and sulphur-containing impurities leaving column 4 of the second adsorption unit was evacuated via the line 16 to a condenser 17 where it was cooled and condensed at 50° C.

The thermal balance of the heating devices used to operate the purification unit in this first embodiment over an adsorption cycle of 24 hours was as follows:

power used for vapour exchanger device=190 kW;

power used for principal electric furnace=190 kW power used for secondary electric furnace=55 kW i.e., the total heating power necessary was approximately 435 kW.

In contrast, if the operation of the two adsorption units were to be decoupled, and thus they were to be operated independently of each other, the heating power for each of the adsorption units would be 380 kW, which would necessitate a total heating power of 760 kW.

Thus, by means of the process of the invention, it is possible to save approximately 40% of energy.

Further, with the process of the invention, there is no longer a need to supply a regeneration fluid externally of the purification unit, for which importing and storage represent a non-negligible cost.

EXAMPLE 2

The second example, which illustrates the mode of operation of the unit described in FIG. 2, is aimed at purifying a hydrocarbon feed at a flow rate of 75575 kg/h, the composition of which is given in Table 3 (as a % by weight):

TABLE 3

| Composition of hydrocarbon feed | |
|---|---|
| $H_2$ | 0.14 |
| METHANE | 0.01 |
| PROPANE | 1.14 |
| PROPENE | 0.02 |
| I-BUTANE | 42.22 |
| BUTANE | 52.59 |
| I-BUTENE | 0.02 |
| 1-BUTENE | 0.24 |
| Cis-2-BUTENE | 0.92 |
| Trans-2-BUTENE | 1.72 |
| PENTANE | 0.56 |
| PENTENE | 0.34 |
| HEXANE | 0.07 |
| HEPTANE | 0.01 | and which contains the impurities (in ppm by weight) summarized in Table 4:

TABLE 4

| Composition of impurities in hydrocarbon feed | |
|---|---|
| Water | 50 |
| COS | 0.1 |
| Total sulphur | 0.1 |
| Acetonitrile | 2.0 as N |
| Acetone | 50.0 |

The feed to be purified was then treated in an adsorption unit which comprised two adsorption columns 1, 2 with the following characteristics:

diameter: 1900 mm height of adsorbent bed: 10000 mm.

These columns were filled with a mixture of adsorbent solids comprising 90% by volume of AxSorb 911 (trade mark) and 10% of AxSorb 980 (trade mark) sold by Axens, which could specifically retain water molecules and nitrogen-containing molecules and acetone.

The liquid hydrocarbon feed to be treated was supplied to the first adsorption column 1 which operated in adsorption mode at a temperature of 40° C. and at a pressure of 2.2 MPa. The treatment in the adsorption column meant that a hydrocarbon effluent with the composition (ppm by weight) of impurities which is given in Table 5 could be produced:

TABLE 5

| Composition of impurities in treated hydrocarbon feed | |
|---|---|
| Water | 0.1 |
| Acetonitrile | 0.1 |
| Acetone | 0.1 |

Simultaneously, the second column of the adsorption unit 2 is in the regeneration phase in order to restore the adsorption capacities of the adsorbent solids saturated with impurities during a preceding cycle. To this end, a fraction of the hydrocarbon feed to be treated was removed upstream of the adsorption unit at a flow rate of 9000 kg/h and sent to a selective hydrogenation reactor 22. The liquid feed which was at a temperature of approximately 40° C. was heated using a heating device 11 (a vapour exchanger) so as to raise the temperature to approximately 80° C. at the inlet to the selective hydrogenation reactor 22.

The selective hydrogenation reactor had the following characteristics:

diameter: 1100 mm;
height of catalyst bed: 8450 mm;
catalyst: LD265 sold by Axens;
pressure: 2.5 MPa;
flow rate of feed at reactor inlet: 9000 kg/h;
flow rate of $H_2$ (purity 99.9% by volume): 68 kg/h Because of the exothermic nature of the hydrogenation reaction, the temperature of the effluent at the outlet from the hydrogenation reactor was approximately 102° C. and the composition (% by weight) is given in Table 6:

TABLE 6

| Composition of treated hydrocarbon feed at outlet from selective hydrogenation reactor | |
|---|---|
| $H_2$ | 0.02 |
| METHANE | 0.01 |
| PROPANE | 1.14 |
| I-BUTANE | 42.08 |
| BUTANE | 55.28 |
| I-BUTENE | 0.01 |
| 1-BUTENE | 0.00 |
| Cis-2-BUTENE | 0.08 |
| Trans-2-BUTENE | 0.20 |
| PENTANE | 1.18 |

The effluent extracted from the hydrogenation reactor 22 was then heated by means of a heating train 12 composed of a vapour exchanger and an electric furnace disposed in succession, to a temperature of approximately 310° C. such that it went into the vapour form. The regenerant gas produced thereby internally of the process was then transferred to the adsorption column to be regenerated, as a counter-current to the direction of introduction of the treated feed. Regeneration was carried out at a temperature of approximately 310° C. and at a pressure of approximately 1.6 MPa.

The gaseous effluent charged with impurities was evacuated from the second column in regeneration mode to a condenser where it was cooled to 50° C.

In the proposed layout, the following thermal balance was obtained for an adsorption cycle time of 18 hours:

power of vapour exchanger 11=260 kW;
power of vapour exchanger of heating train 12=1365 kW;
power of secondary electric furnace of heating train 12=1000 kW.

In accordance with the invention, the total heating power was thus approximately 2625 kW. The second embodiment of the process, by integrating the hydrogenation step with the adsorption step, could be used to exploit the exothermic nature of this selective hydrogenation step in order to heat the fluid and thus reduce the heating power required to bring the purge gas to the operating temperature.

In the situation in which the hydrogenation unit were to function in a manner which is independent of the adsorption unit (decoupling of adsorption and of selective hydrogenation), it would be necessary to cool the hydrotreated feed (for its storage and/or transport), then to reheat it before using it as a regeneration fluid. In this case, the thermal balance figure would show that the heating power of the vapour exchanger 11 (for the selective hydrogenation unit) would remain unchanged at 260 kW, while the heating power of the vapour exchanger and the secondary electric furnace of the heating train 12 would respectively be 1690 kW and 1000 kW, giving a total heating power to be used of 2960 kW.

Thus, by means of the process of the invention, an energy saving of approximately 11% is made. Furthermore, the process means that there is no need to provide an intermediate fluid, which would inevitably incur supplemental costs.

EXAMPLE 3

The third example illustrates the operation of the purification unit described in the third embodiment of FIG. 3.

The process was carried out to purify a naphtha cut at a flow rate of 13585 kg/h and with the following composition (as a % by weight):

TABLE 7

| Composition of naphtha cut | |
|---|---|
| N-BUTANE | 0.02 |
| I-PENTANE | 5.21 |
| N-PENTANE | 5.89 |
| 2,2-DIMETHYLBUTANE | 1.17 |
| 2,3-DIMETHYLBUTANE | 4.54 |
| 2-METHYLPENTANE | 18.95 |
| 3-METHYLPENTANE | 13.69 |
| N-HEXANE | 24 |
| CYCLOPENTANE | 1.14 |
| METHYLCYCLOPENTANE | 10.32 |
| BENZENE | 2.37 |
| CYCLOHEXANE | 10.13 |
| N-HEPTANE | 1.62 |
| METHYLCYCLOHEXANE | 0.63 |
| 1,1-DIMETHYLCYCLOHEXANE | 0.32 |

The naphtha cut also contained the following impurities (ppm by weight)

TABLE 8

| Composition of impurities in naphtha cut | |
|---|---|
| $H_2S$ | 2 ppm by weight as S |
| ethyl-mercaptan | 1 ppm by weight as S |
| propyl-mercaptan | 1 ppm by weight as S |
| $CO_2$ | 10 ppm by weight |

The aim of the adsorption treatment was to eliminate $CO_2$ and comply with the set specifications. To this end, an adsorption/regeneration unit comprising two adsorption columns operating in parallel and alternately in adsorption mode and in regeneration mode was used. The adsorption columns 1 and 2 had the following characteristics:

diameter: 800 mm;
height of bed of adsorbent: 2800 mm

The two columns 1 and 2 were filled with a mixture of adsorbent solids comprising, by volume, 78% of AxSorb 951 (trademark) and 22% of AxSorb 980 (trademark) sold by Axens.

In adsorption mode, columns 1 or 2 are operated at a temperature of 50° C. and at a pressure of 4 MPa.

The treatment by adsorption of the naphtha cut in columns 1 or 2 produces a purified naphtha cut having a total sulphur content of 5 ppm by weight as S and a $CO_2$ content of 1 ppm by weight.

In this Example 3, an internal fluid was used, generated in situ with respect to the process and which was obtained by treatment of the purified naphtha cut in order to reduce its concentration of mercaptan-like compounds. The aim of this treatment was to reduce the formation of coking precursors which are obtained from the thermal decomposition of mercaptans.

The naphtha cut purified by the adsorption unit was initially heated by a vapour exchanger 11 to a temperature of approximately 140° C., and then treated at a flow rate of 2500 kg/h in an adsorption column filled with a non-regenerable adsorbent solid AxTrap 405 (trademark) sold by Axens. The adsorption column 24 had the following characteristics:

diameter: 600 mm;
height of bed of adsorbent: 2300 mm
temperature: 140° C.;
pressure: 1.5 MPa.

The desulphurized effluent leaving the adsorption column 24 was then heated to a temperature of approximately 310° C. by passage through a heating train 12 composed of a vapour exchanger and an electric furnace. The hot fluid was then supplied to one of columns 1 or 2 to regenerate the adsorbent solid which was saturated with impurities. It was supplied as a counter-current with respect to the direction of introduction of the feed to be treated when the column operated in the adsorption phase. Regeneration was carried out at a temperature of approximately 310° C. and at a pressure of approximately 1.3 MPa.

The thermal balance for an adsorption cycle time of 24 hours was as follows:

power of vapour exchanger 11=174 kW;
power of vapour exchanger of heating train 12=260 kW;
power of secondary electric furnace of heating train 12=288 kW.

Thus, a total heating power of 722 kW was necessary.

If the operation of the adsorption unit were to be decoupled from that of the desulphurization unit, the heating powers of the vapour exchanger 11 and the electric furnace of the heating train 12 would remain unchanged. However, it would be necessary to increase the heating power of the vapour exchanger of the heating train 12 to 434 kW in order to compensate for the heat lost due to cooling the desulphurized naphtha feed when the desulphurization step was disconnected from the adsorption step.

Thus, in total, a heating power of 896 kW would be required.

By means of the process of Example 3 of the invention, an energy saving of approximately 20% was made, while at the same time the problem of providing a source external to the regeneration fluid is solved.

EXAMPLE 4

Comparative to Example 1

Example 4 was identical to Example 1 in all points, apart from the fact that the regeneration was carried out as a co-current to the adsorption and not as a counter-current (case of Example 1). FIG. 4 illustrates the operation of the process.

Because the regeneration was carried out as a co-current, the regeneration characteristics had to be different from those of Example 1.

The characteristics of the adsorption columns 3 and 4 of the adsorption unit for the treatment of the secondary hydrocarbon feed were as follows:
  diameter: 600 mm;
  height of bed of adsorbent: 5100 mm.

The solids used and their respective distributions were identical to those of Example 1.

A fraction of the LPG feed at a temperature of 40° C. was taken off upstream of the first adsorption unit and sent to the adsorption column 3. The dimensions of column 3 were such that 1540 kg/h of feed with the same composition as that shown in Tables 1 and 2 could be treated. The temperature and pressure of operation of the column 3 in adsorption mode were 40° C. and 1.7 MPa respectively. The treated effluent leaving column 3 and having water and total sulphur contents of less than 1 ppm was heated in a heating train to 310° C., a temperature at which the treated LPG was in the vapour form, before being sent through one of the columns of the first adsorption unit which was in the regeneration phase. The heating train 12 comprised a vapour exchanger and a principal electric furnace.

Regeneration was carried out at a temperature of approximately 310° C. and at a pressure of approximately 1.5 MPa.

The hot regeneration fluid after circulation in the adsorption column in regeneration mode was used as a fluid to regenerate the adsorbent solid of column 4 of the second adsorption unit. Before it passed into said column in regeneration mode, the regeneration fluid was again heated in a heating device 12, which was a secondary electric furnace, in order to bring the temperature of the fluid to approximately 310° C.

The residual fluid charged with water and sulphur-containing impurities leaving the column 4 of the second adsorption unit was evacuated via the line 16 to a condenser 17, where it was cooled and condensed to 50° C.

The thermal balance of the heating devices to operate the purification unit in accordance with this first embodiment during a 24 hour adsorption cycle was as follows:
  power used for the vapour exchanger device=225 kW;
  power used for the principal electric furnace=65 kW;
i.e. a total necessary heating power of approximately 515 kW.

The quantity of energy to regenerate columns 1 and 2 in co-current mode (Example 4) was thus significantly higher than that necessary for regeneration in counter-current mode (Example 1).

EXAMPLE 5

Comparative to Example 2

This example was identical to Example 2 in all points, except for the fact that regeneration of columns 1 or 2 was carried out as a co-current and not as a counter-current, as was the case for Example 2. The mode of operation of the unit described in this example is shown in FIG. 5.

Simultaneously, the second column of the adsorption unit 2 was in the regeneration phase in order to restore the adsorption capacities of the adsorbent solids saturated with impurities during a preceding cycle. To this end, a fraction of the hydrocarbon feed to be treated was withdrawn upstream of the adsorption unit at a flow rate of 10800 kg/h and sent to a selective hydrogenation reactor 22. The liquid feed, which was at a temperature of approximately 40° C., was heated using a heating device 11 (a vapour exchanger) so as to raise the temperature at the inlet to the selective hydrogenation reactor 22 to approximately 80° C.

The selective hydrogenation reactor had the following characteristics:
  diameter: 1200 mm;
  height of the catalyst bed: 8550 mm;
  catalyst: LD265 sold by Axens;
  pressure: 2.5 MPa;
  flow rate of feed at reactor inlet: 10800 kg/h;
  flow rate of $H_2$ (purity 99.9% by volume): 82 kg/h.

Because of the exothermic nature of the hydrogenation reaction, the temperature of the effluent at the outlet from the hydrogenation reactor was approximately 102° C. and it had the composition (% by weight) given in Table 6:

TABLE 6

| Composition of the treated hydrocarbon feed at the outlet from the selective hydrogenation reactor | |
|---|---|
| $H_2$ | 0.02 |
| METHANE | 0.01 |
| PROPANE | 1.14 |
| I-BUTANE | 42.08 |
| BUTANE | 55.28 |
| I-BUTENE | 0.01 |
| 1-BUTENE | 0.00 |
| Cis-2-BUTENE | 0.08 |
| Trans-2-BUTENE | 0.20 |
| PENTANE | 1.18 |

The effluent extracted from the hydrogenation reactor 22 was then heated using a heating train 12 composed of a vapour exchanger and an electric furnace disposed in succession, to a temperature of approximately 310° C., such that it was in the vapour phase. The regeneration gas produced thereby internally of the process was then transferred as a co-current to the adsorption column to be regenerated. Regeneration was carried out at a temperature of approximately 310° C. and at a pressure of approximately 1.6 MPa.

The gaseous effluent charged with impurities was evacuated from the second column in regeneration mode to a condenser, where it was cooled to 50° C.

In the proposed layout, the following thermal balance was obtained for an adsorption cycle time of 18 hours:
  power of vapour exchanger 11=315 kW;
  power of vapour exchanger of heating train 12=1640 kW;
  power of secondary electric furnace of heating train 12=1200 kW;
i.e. a total heating power of approximately 3155 kW.

It will thus be seen that regeneration in co-current mode (Example 5) consumes more energy than regeneration in counter-current mode (Example 1).

The invention claimed is:

1. A process for purifying a hydrocarbon feed comprising impurities, in which the following steps are carried out simultaneously:
  a) treating the hydrocarbon feed in the liquid phase in a first adsorption unit comprising a first and a second adsorption column (1, 2) respectively filled with a first and second adsorbent solid, the first and second adsorption columns (1, 2) operating in parallel and alternately in adsorption mode or in regeneration mode, said hydrocarbon feed being introduced into the first adsorption column (1) and brought into contact with the first adsorbent solid, and a hydrocarbon effluent which is depleted in impurities is taken off at an outlet from the first adsorption column (1);

b) treating a secondary liquid hydrocarbon feed, which is constituted either by a fraction of the hydrocarbon feed or by a fraction of the hydrocarbon effluent depleted in impurities from step a), in a second adsorption unit, and a treated secondary liquid hydrocarbon feed is taken off from said second adsorption unit;

c) heating the treated secondary liquid hydrocarbon feed obtained from step b) to a temperature of from 100 to 350° C.;

d) regenerating the second adsorbent solid of the second adsorption column (2) with the treated secondary hydrocarbon feed heated in step c) by bring said treated secondary hydrocarbon feed into contact with the second adsorbent solid in order to desorb the impurities from the second adsorbent solid and produce a first effluent charged with impurities, step d) being carried out by sending said heated secondary hydrocarbon feed to the second adsorption column in a counter-current direction to the flow of the hydrocarbon feed being introduced into the first adsorption column (1), in which the second adsorption unit of step b) comprises a third and fourth adsorption column (3, 4) respectively comprising a third and fourth adsorbent solid, in which the secondary liquid hydrocarbon feed is brought into contact in the third adsorption column (3) with the third adsorbent solid so as to produce the treated secondary liquid hydrocarbon feed, and in which the effluent charged with impurities obtained from the second adsorption column (2) in step d) is sent to the fourth adsorption column (4) so as to regenerate the fourth adsorbent solid and evacuate a second effluent charged with impurities.

2. The process as claimed in claim 1, in which the mode of operation of the third and fourth adsorption columns is switched so that the fourth adsorption column (4) is used to treat the secondary liquid hydrocarbon feed in an adsorption mode and the third adsorption column (3) is used in a regeneration mode to regenerate the effluent charged with impurities obtained from the second adsorption column (2).

3. The process as claimed in claim 1, in which at least a portion of organo-sulphur compounds present in the secondary liquid hydrocarbon feed is eliminated by adsorption in the second adsorption unit of step b).

4. The process as claimed in claim 1, in which the mode of operation of the first and second adsorption columns (1, 2) is switched such that the second adsorption column (2) operates in adsorption mode and the first column (1) operates in regeneration mode when an adsorption capacity of the first adsorption solid is reached.

5. The process as claimed in claim 2, in which the mode of operation of the first and second adsorption columns (1, 2) is switched such that the second adsorption column (2) operates in adsorption mode and the first column (1) operates in regeneration mode when the adsorption capacity of the first adsorption solid is reached, in which the mode of operation, adsorption or regeneration, of the first and third columns (1, 3) is switched simultaneously and the mode of operation, adsorption or regeneration, of the second and fourth adsorption columns (2, 4) is switched simultaneously.

6. The process as claimed in claim 1, in which the dimensions of the second adsorption unit are such that it can treat a quantity of the secondary liquid hydrocarbon feed necessary and sufficient to regenerate the second adsorbent solid.

7. The process as claimed in claim 1, in which the hydrocarbon feed is selected from a cut comprising hydrocarbons containing 2 to 8 carbon atoms and a cut comprising hydrocarbons having boiling points in the range 0° C. to 200° C.

8. The process as claimed in claim 1, in which the adsorbent solids of the first and/or the second adsorption unit comprise at least one element selected from activated or promoted aluminas, clays, molecular sieves such as zeolites, silica gels, silica-aluminas, activated carbon, metallic oxides (by themselves or mixed with one or more binders or deposited on a support), metallic sulphides (by themselves or mixed with one or more binders or deposited on a support), reduced metals (by themselves or mixed with one or more binders or deposited on a support) which may optionally be doped and/or sulphurized, and MOFs (Metal Organic Frameworks).

* * * * *